US009461692B2

(12) United States Patent
Lockwood

(10) Patent No.: US 9,461,692 B2
(45) Date of Patent: Oct. 4, 2016

(54) PROTECTIVE COVER FOR A DEVICE

(71) Applicant: HEWLETT-PACKARD DEVELOPMENT COMPANY, L.P., Houston, TX (US)

(72) Inventor: Robert J Lockwood, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/907,960

(22) PCT Filed: Sep. 27, 2013

(86) PCT No.: PCT/US2013/062283
§ 371 (c)(1),
(2) Date: Jan. 27, 2016

(87) PCT Pub. No.: WO2015/047311
PCT Pub. Date: Apr. 2, 2015

(65) Prior Publication Data
US 2016/0197634 A1 Jul. 7, 2016

(51) Int. Cl.
H04M 1/00 (2006.01)
H04B 1/3888 (2015.01)
G06F 1/16 (2006.01)
A45C 11/00 (2006.01)

(52) U.S. Cl.
CPC .............. *H04B 1/3888* (2013.01); *A45C 11/00* (2013.01); *G06F 1/1632* (2013.01); *A45C 2011/003* (2013.01); *G06F 2200/1634* (2013.01)

(58) Field of Classification Search
CPC ............... H04B 1/3888; G06F 1/1626; G06F 2200/1633; G06F 1/1616; G06F 1/1628; G06F 1/1681; G06F 1/1624; G06F 1/181; G06F 1/1618

USPC ............ 455/575.8, 575.1, 566, 575.3, 550.1, 455/73, 90.2, 90.3, 422.1, 403, 557, 556.1, 455/556.2; 361/679.17, 679.01, 679.09, 361/679.26
See application file for complete search history.

(56) References Cited

U.S. PATENT DOCUMENTS 8,467,186 B2   6/2013  Zeliff et al.
2012/0088557 A1  4/2012  Liang
(Continued)

FOREIGN PATENT DOCUMENTS

CN   202897087 U   1/2013
FR      2980596       3/2013
(Continued)

OTHER PUBLICATIONS

Baxtton; "Belkin Ultimate Keyboard Case for IPAD"; Jun. 11, 2013; 7 pages.
(Continued)

*Primary Examiner* — Keith Ferguson
(74) *Attorney, Agent, or Firm* — HP Inc. Patent Department

(57) ABSTRACT

Examples disclosed herein provide a protective cover for a portable computing device. The protective cover can include a first portion and a second portion pivotally attached to the first portion at a first end of the second portion. A second end of the second portion can be coupled to a back surface of the device. The first portion can include a keyboard and a connector to electrically couple the keyboard with the device when the connector is connected with a port of the device.

13 Claims, 3 Drawing Sheets

(56) References Cited

U.S. PATENT DOCUMENTS

| | | | |
|---|---|---|---|
| 2012/0194308 A1 | 8/2012 | Lauder et al. | |
| 2012/0211377 A1 | 8/2012 | Sajid | |
| 2013/0088431 A1 | 4/2013 | Ballagas et al. | |
| 2013/0163197 A1* | 6/2013 | Mack | F16M 11/00 361/679.56 |
| 2013/0214661 A1 | 8/2013 | McBroom | |
| 2014/0071606 A1* | 3/2014 | Bates | H01H 13/704 361/679.09 |

FOREIGN PATENT DOCUMENTS

| | | |
|---|---|---|
| TW | M421680 U1 | 1/2012 |
| TW | M459753 U1 | 8/2013 |

OTHER PUBLICATIONS

Kendrick, J.; "Hands-on with the Logitech Ultrathin Keyboard Cover (video)"; Apr. 22, 2012; 6 pages.

* cited by examiner

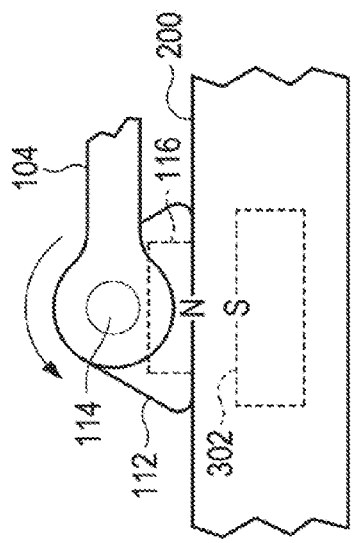
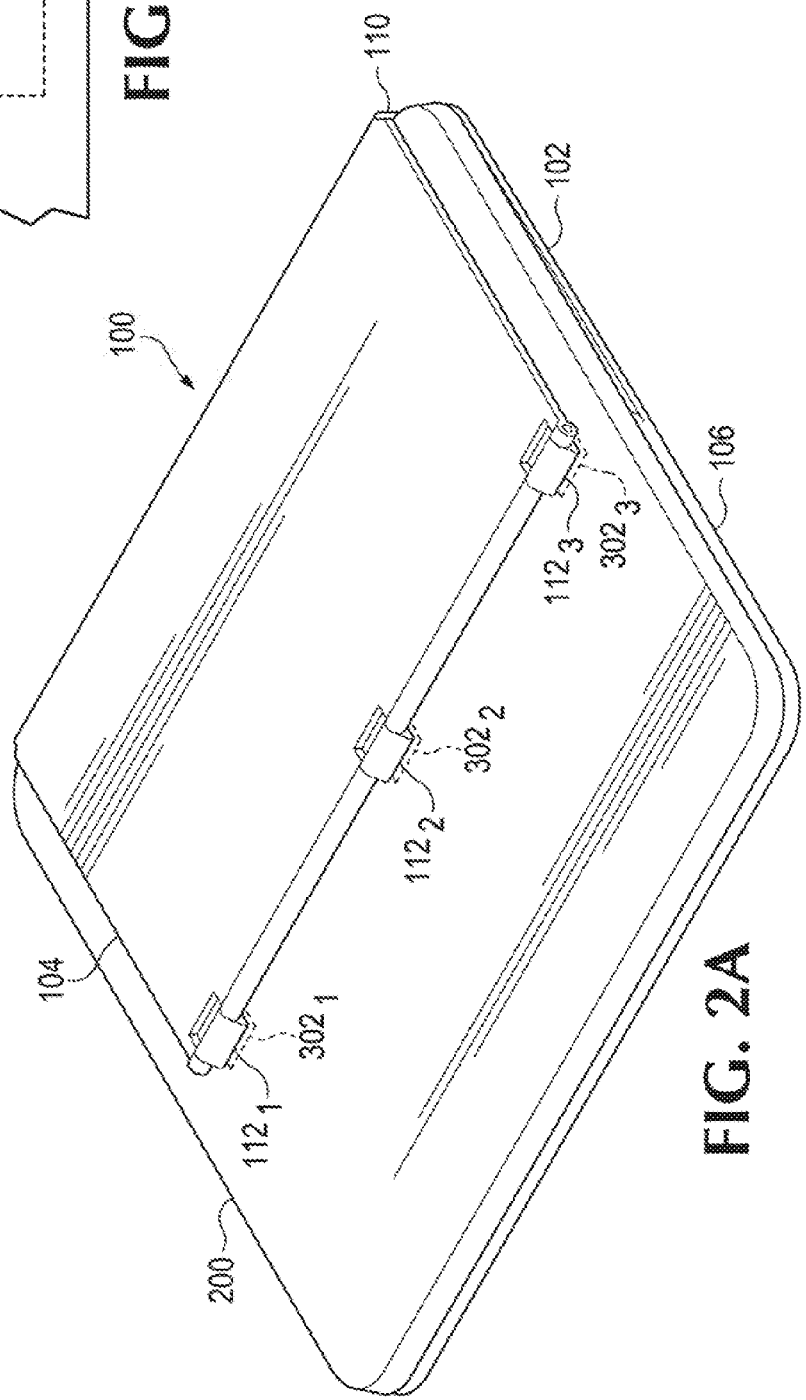

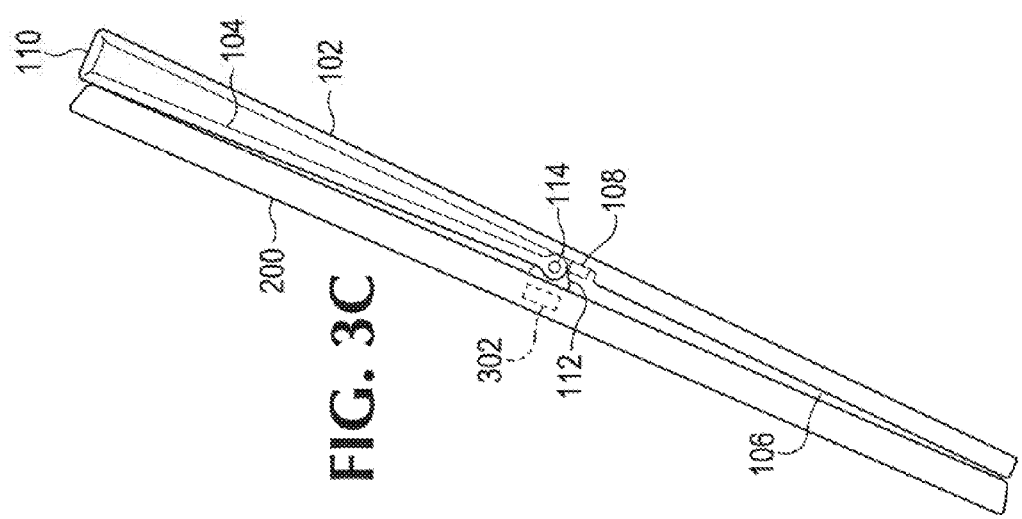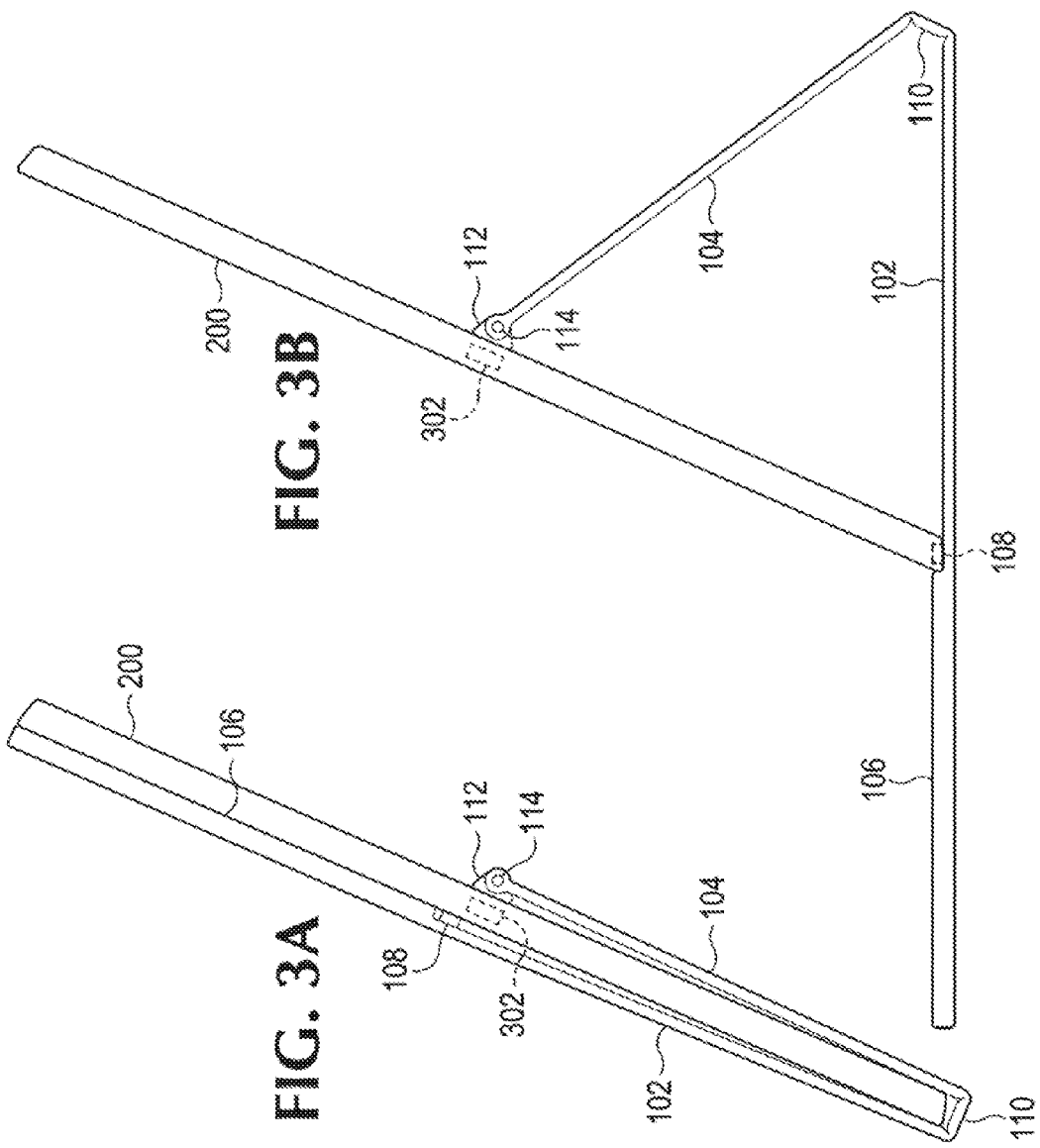
FIG. 3A  FIG. 3B  FIG. 3C

PROTECTIVE COVER FOR A DEVICE

BACKGROUND

The emergence and popularity of mobile computing has made portable computing devices, due to their compact design and light weight, a staple in today's marketplace. Tablet computers are examples of portable computing devices that are widely used. Tablet computers generally employ a touchscreen on a display surface of the tablet that may be used for both viewing and input. Users of tablets may interact with the touchscreen via finger or stylus gestures. As an example, an on-screen keyboard may be illustrated on the touchscreen surface for entering characters.

BRIEF DESCRIPTION OF THE DRAWINGS

FIGS. 2A-B illustrates the accessory magnetically coupled to a back surface of the device, according to an example; and FIGS. 3A-C illustrate the device used with the accessory in different modes, according to an example.

DETAILED DESCRIPTION

Figure 1:
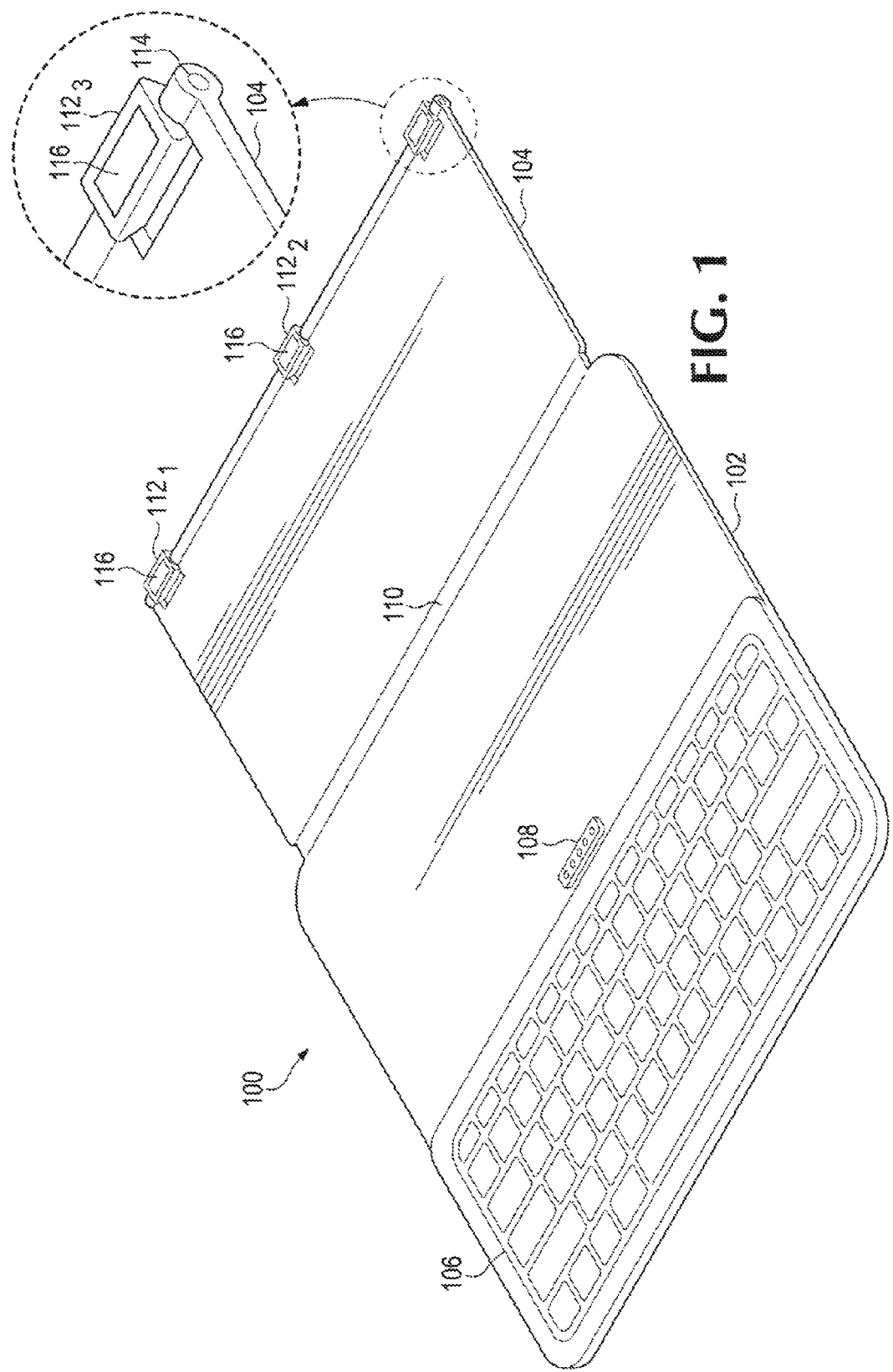
FIG. 1 illustrates an accessory for a portable computing device, according to an example.

While using a portable computing device such as a tablet computer, there may be instances when users may desire to enter characters via an external, physical keyboard, particularly when creating content or typing for a prolonged period of time (e.g., creating a document, spreadsheet, or slides). Accessories are available for tablet computers that include a physical keyboard for entering characters. Such accessories may be fitted to a tablet computer in various form factors. When designing such accessories, factors that may be considered include at least aesthetics and ease of use. When choosing a tablet accessory including a physical keyboard, in addition to having the ability enter characters via the keyboard, users may also consider the overall appearance of the tablet computer when fitted with the accessory. With regards to ease of use, users may consider the ease of adding and removing the accessory from the tablet, and the ease of using the accessory while it is fitted to the tablet. For example, users may consider whether the system including the accessory fitted to the tablet is stable and sturdy for use on various surfaces (e.g., on a user's lap or a level surface, such as a desk or table).

Examples disclosed herein provide an accessory for a portable computing device such as a tablet computer. The accessory includes a physical keyboard and may also function as a protective cover to protect at least the display surface of the device when not in use.

In one example, a system can include a portable computing device, including a display surface and a back surface opposite the display surface, and a protective cover for the device. The protective cover can include a first portion and a second portion pivotally attached to the first portion at a first end of the second portion. A second end of the second portion can be coupled to the back surface of the device. The first portion can include a keyboard and a connector to electrically couple the keyboard with the device when the connector is connected with a port of the device.

In another example, a protective cover for a device can include a first portion and a second portion pivotally attached to the first portion at a first end of the second portion. The first portion can include a keyboard and a connector to electrically couple the keyboard with the device when the connector is connected with a port of the device. The protective cover can include a hinge mechanism attached to a second end of the second portion to magnetically couple to a back surface of the device and rotate the second portion through a range relative to the back surface when the hinge mechanism is magnetically coupled to the back surface.

In yet another example, a protective cover for a device can include a first portion and a second portion flexibly attached to the first portion at a first end of the second portion. A second end of the second portion can be coupled to a back surface of the device. The first portion can include a keyboard and a connector to electrically couple the keyboard with the device when the connector is connected with a port of the device.

With reference to the figures, FIG. 1 illustrates an accessory 100 for a portable computing device such as a tablet computer, according to an example. The accessory 100 includes a physical keyboard 106 and may also function as a protective cover to protect at least the display surface of the device, as will be further described. The accessory 100 includes a first portion 102 and a second portion 104 pivotally attached to the first portion 102 at an end of the second portion 104. As an example, the accessory 100 may include the first portion 102 and the second portion 104 separated from each other by a folding region 110 (e.g., pivotally or flexibly attached), in this way, the portions 102, 104 may be folded with respect to each other at the folding region 110.

The first portion 102 and the second portion 104 may be composed of a rigid or semi-rigid material in order to provide a level of sturdiness and rigidity while using the accessory 100 with the device. Examples of materials that may be used for the portions 102, 104 include, but are not limited to, plastics, fiber glass, carbon fiber composites, and metals. The first portion 102 and the second portion 104 may be separated by the thinner folding region 110 that is composed of foldable or pliable material.

Referring to FIG. 1, the keyboard 106 may be attached to the first portion 102, and a connector 108 may be attached to the first portion 102 to electrically couple the keyboard 106 for electronic communications with the device when the connector 108 is connected with a port of the device (e.g., see FIG. 3B). Although FIG. 1 illustrates the connector 108 for handling transmissions between the keyboard 106 and the device, transmissions may be exchanged between the keyboard 106 and the device by other forms of communications that may not require the connector 108, such as a form of wireless communication (e.g., Bluetooth).

The accessory 100 may be coupled to a back surface of the portable computing device at another end of the second portion 104 (e.g., see FIG. 2A). As an example, the second portion 104 may be coupled to the back surface of the portable computing device by a hinge mechanism attached to the other end of the second portion 104, allowing the second portion 104 of the accessory 100 to rotate through a range relative to the back surface of the device (e.g., 180 degrees), as will be illustrated in FIGS. 3A-C. The accessory 100 may be permanently coupled to the device or detachably coupled, allowing a user to attach and detach the accessory 100 from the device as desired. The accessory 100 may be detachably coupled to the device by various types of couplings including, but not limited to, mechanical, electrical, static, magnetic, and frictional. However, magnetic coupling between the accessory 100 and the device will be further described.

Referring to FIG. 1, hinge mechanism of the accessory 100 may include a plurality of attachment features 112 that magnetically couple to the back surface of the device. Although three attachment features 112 are illustrated, any number of attachment features 112 may be used. In addition, the size of each attachment feature 112 may vary. Each attachment feature 112 may include magnetic members 116. Magnetic members 116 may include a variety of magnetically active components that provide an associated magnetic field. As an example, the hinge mechanism may include a shaft 114 that runs along an end of the second portion 104 of the accessory 100, as illustrated in FIG. 1. The shaft 114 may also link the attachment features 112 to each other, allowing the attachment features 112 to each rotate independently or in unison with respect to each other.

FIG. 2A illustrates the accessory 100 magnetically coupled, via the attachment features 112 of the hinge mechanism, to a back surface of a portable computing device 200, according to an example. As an example, the back surface of the device 200 may be formed of non-magnetic material, and the device 200 may include magnetic members 302 disposed within the device 200. By forming the back surface of the device of non-magnetic material, such as plastic or non-ferrous metal (e.g., aluminum), magnetic fields generated by the magnetic members 302 may be configured to work through the back surface of the device 200. As a result, the magnetic members 116 included in the attachment features 112 of the accessory 100 may magnetically couple with the magnetic members 302 disposed within the device 200 when the hinge mechanism of the accessory 100 is placed within proximity of the back surface of the device 200.

As an example, when the hinge mechanism of the accessory 100 is placed within proximity of the back surface of the device 200, the accessory 100 and the device 200 may remain in the magnetically attached state if and until a releasing force of sufficient magnitude is applied that overcomes the overall net attractive magnetic force between the magnetic members 116, 302.

As an example, the number of magnetic members 302 disposed within the device 200 may correspond to the number of attachment features 112 of the accessory 100, as illustrated. As an example, the magnetic members 302 may include a variety of magnetically active components that provide an associated magnetic field to cooperatively interact with the magnetic fields generated by the magnetic members 116 of the accessory 100. As an example, the magnetic members 302 may include magnetically passive elements that can interact with the magnetic fields generated by the magnetic members 116 of the accessory 100. Examples of magnetically passive elements include, but are not limited to, ferromagnetic materials such as iron or steel.

By using magnetic members 302 disposed within the device 200, the back surface of the device 200 may have a smooth finish and remain undisturbed, contributing to the overall aesthetic appeal of the device 200. In addition, magnetically coupling the accessory 100 to the device 200 may provide an appearance of oneness by in which the accessory 100 and tablet 200 can appear as a single, unified entity, providing uniformity in appearance. The uniformity in the magnetic coupling between the accessory 100 and the device 200 may be facilitated by the surface of the attachment features 112 of the accessory 100 and the back surface of the device 200 forming a well matched fit to each other.

The magnetic members 302 within the device 200 and the magnetic members 116 of the accessory 100 may be arranged to produce magnetic fields that cooperate with each other to generate a magnetic attractive force that attaches the accessory 100 and the device 200 together in a mating engagement. Properties of the magnetic members 116, 302 that may be controlled include, but are not limited to, field strength and magnetic polarity.

With regards to magnetic polarity, magnetic elements having the same polarity (e.g., N-N or S-S) may generate a negative or repulsive magnetic force, whereas those corresponding magnetic elements having opposite polarities (e.g., N-S) will generate a positive or attractive magnetic force. As an example, a north pole of the magnetic members 116 of the accessory 100 may generate a positive or attractive magnetic force with a south pole of the magnetic members 302 disposed within the device 200, as illustrated in FIG. 2B. This positive or attractive magnetic force may be generated when the hinge mechanism of the accessory 100 is placed within proximity of the back surface of the device 200. When detaching the accessory 100 from the device 200, the releasing force required to overcome this attractive magnetic force may be determined by controlling properties of one or more of the magnetic members 116, 302, such as the field strength.

As an example, the magnetic members 116, 302 used to magnetically attach the accessory 100 and the device 200 can assure that the accessory 100 may only attach to the device 200 in a specific orientation. For example, it may not be desirable to attach the accessory 100 to the device 200 in an orientation that is reversed from what is illustrated in FIG. 2A (e.g., $112_1$ to $302_3$ and $112_3$ to $302_1$). As an example, this reverse orientation may be avoided by controlling properties of one or more of the magnetic members 116, 302, such as the magnetic polarity. For example, the magnetic member 116 included in $112_1$ may require a north pole of a magnetic member 302 disposed within the device 200, and the magnetic member 116 included in $112_3$ may require a south pole of a magnetic member 302 in order to generate an attractive magnetic force between the accessory 100 and the device 200. Therefore, if $302_1$ is arranged to have a north pole, and $302_3$ is arranged to have a south pole, any attempt made to attach the accessory in a reverse orientation may generate a repulsive magnetic force rather than an attractive magnetic force.

In addition to ensuring that the accessory 100 may only attach to the device 200 in a specific orientation, the magnetic members 116, 302 may also assure proper alignment and positioning of the accessory 100 with respect to the device 200. As a result, a user may attach the accessory 100 to the device 200 in a desired and repeatable manner, such that they are consistently in a pre-determined position relative to one another.

FIGS. 3A-C illustrate the device 200 used with the accessory 100 in different modes, according to an example. As described above, the hinge mechanism of the accessory 100 may allow the second portion 104 of the accessory 100 to rotate through a range relative to the back surface of the device 200 (e.g., arrow indicated in FIG. 2B), allowing the device 200 to be used with the accessory 100 in different modes. Referring to FIG. 3A, the accessory 100 may function as a protective cover, with the first portion 102 of the accessory 100 protecting a display surface of the device 200 (e.g., when the device 200 is not in use). The second portion 104 of the accessory may rotate via the hinge mechanism to protect a portion of the back surface of the device 200, and the first portion 102 may wrap around to protect the display surface via the foldable region 110. As an example, a region of the first portion 102 (e.g., around the keyboard 106) may include a magnetic member to cooperatively interact with a magnetic member disposed within the device 200, in order to ensure that the first portion 102 remains closed to protect the display surface of the device 200.

Referring to FIG. 3B, the device 200 may be docked with connector 108 of the accessory 100 in order to electrically couple the keyboard 106 for electronic communications with the device 200. As an example, the port of the device 200 used for docking with the connector 108 may be a common port used for other various purposes, such as for charging the device 200. In order to prevent accidental keyboard input when the device 200 is used in other modes (e.g., see FIGS. 3A and 3C), the keyboard 106 may only be powered when the device 200 is docked with the connector 108.

As described above, the first portion 102 and the second portion 104 of the accessory 100 may be composed of a rigid or semi-rigid material in order to provide a level of sturdiness and rigidity while using the accessory 100 with the device 200. As a result, the second portion 104 may support the device 200 at a viewing angle that is appropriate for a user, and the first portion 102 may provide a level of sturdiness to use the accessory 100 with the device 200 on various surfaces (e.g., on a user's lap or a level surface, such as a desk or table).

Referring to FIG. 3C, the accessory 100 may be folded up behind the device 200 in order to use the device 200 for touch or consumption use. By folding the accessory 100 behind the device 200, the first portion 102 may protect the back surface of the device 200, and the device 200 may be used without being hindered by the accessory 100. As an example, a region of the first portion 102 (e.g., around the keyboard 106) may include a magnetic member to cooperatively interact with a magnetic member disposed within the device 200, in order to ensure that the first portion 102 remains magnetically coupled with the back surface of the device 200. As illustrated in FIGS. 3A and 3C, the hinge mechanism of the accessory 100 may allow the second portion 104 of the accessory 100 to rotate through a range relative to the back surface of the device (e.g., 180 degrees).

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system, comprising:
    a portable computing device including a display surface and a back surface opposite the display surface; and
    a protective cover for the device, comprising:
        a first portion;
        a keyboard attached to the first portion;
        a connector attached to the first portion to electrically couple the keyboard with the device when the connector is connected with a port of the device; and
        a second portion pivotally attached to the first portion at a first end of the second portion and coupled to the back surface of the device at a second end of the second portion, wherein the second portion is magnetically coupled to the back surface of the portable computing device by it hinge mechanism attached to the second end of the second portion to rotate the second portion through a range relative to the back surface when the hinge mechanism is magnetically coupled to the back surface.

2. The system of claim 1, wherein the back surface of the portable computing device is formed of non-magnetic material and the portable computing device includes magnetic members disposed within the device.

3. The system of claim 2, wherein the hinge mechanism of the protective cover comprises magnetic members to magnetically couple with the magnetic members disposed within the portable computing device when the hinge mechanism is placed within proximity of the back surface of the device.

4. The system of claim 3, wherein the magnetic members of the protective cover is to magnetically couple with the magnetic members disposed within the portable computing device according to a specific orientation.

5. The system of claim 1, wherein the second portion of the protective cover is to rotate via the hinge mechanism to protect a portion of the back surface of the portable computing device and the first portion of the protective cover is to protect the display surface of the device.

6. The system of claim 1, wherein the second portion of the protective cover is to rotate via the hinge mechanism for the first portion of the protective cover to protect the back surface of the portable computing device.

7. The system of claim 1, wherein the second portion of the protective cover is to support the portable computing device at a viewing angle for a user when the connector is connected with the port of the device.

8. A protective cover for a device, comprising:
    a first portion;
    a keyboard attached to the first portion;
    a connector attached to the first portion to electrically couple the keyboard with the device when the connector is connected with a port of the device;
    a second portion pivotally attached to the first portion at a first end of the second portion; and
    a hinge mechanism attached to a second end of the second portion to magnetically couple to a back surface of the device and rotate the second portion through a range relative to the back surface when the hinge mechanism is magnetically coupled to the back surface.

9. The protective cover of claim 8, wherein the hinge mechanism comprises magnetic members to magnetically couple with magnetic members disposed within the device when the hinge mechanism is placed within proximity of the back surface of the device.

10. The protective cover of claim 9, wherein the magnetic members of the hinge mechanism is to magnetically couple with the magnetic members disposed within the device according to a specific orientation.

11. The protective cover of claim 8, wherein the second portion is to support the device at a viewing angle for a user when the connector is connected with the port of the device.

12. A protective cover for a device, comprising:
   a first portion;
   a keyboard attached to the first portion;
   a connector attached to the first portion to electrically couple the keyboard with the device when the connector is connected with a port of the device; and
   a second portion flexibly attached to the first portion at a first end of the second portion and coupled to a back surface of the device at a second end of the second portion, wherein the second portion is magnetically coupled to a back surface of the device by a hinge mechanism attached to the second end of the second portion to rotate the second portion through a range relative to the back surface when the hinge mechanism is magnetically coupled to the back surface.

13. The protective cover of claim 12, wherein the hinge mechanism comprises magnetic members to magnetically couple with magnetic members disposed within the device when the hinge mechanism is placed within proximity of the back surface of the device.

* * * * *